(12) United States Patent
Wang

(10) Patent No.: US 10,297,217 B2
(45) Date of Patent: May 21, 2019

(54) LIQUID CRYSTAL DISPLAY AND THE DRIVING CIRCUIT THEREOF

(71) Applicant: Shenzhen China Star Optoelectronics Technology Co., Ltd., Shenzhen, Guangdong (CN)

(72) Inventor: Zhao Wang, Guangdong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 300 days.

(21) Appl. No.: 15/309,188

(22) PCT Filed: Sep. 27, 2016

(86) PCT No.: PCT/CN2016/100300
§ 371 (c)(1),
(2) Date: Nov. 6, 2016

(87) PCT Pub. No.: WO2017/215147
PCT Pub. Date: Dec. 21, 2017

(65) Prior Publication Data
US 2018/0190222 A1    Jul. 5, 2018

(30) Foreign Application Priority Data
Jun. 12, 2016   (CN) .......................... 2016 1 0414823

(51) Int. Cl.
*G09G 3/36*    (2006.01)
*G02F 1/1345*  (2006.01)
*G02F 1/1368*  (2006.01)

(52) U.S. Cl.
CPC ......... *G09G 3/3648* (2013.01); *G02F 1/1368* (2013.01); *G02F 1/13452* (2013.01);
(Continued)

(58) Field of Classification Search
CPC .. G09G 3/3648; G09G 3/3614; G02F 1/1368; G02F 1/3452
See application file for complete search history.

(56) References Cited

U.S. PATENT DOCUMENTS

2006/0238476 A1* 10/2006 Park ....................... B82Y 10/00
                                                    345/92
2007/0176878 A1*  8/2007 Lee ....................... G09G 3/2011
                                                    345/98
(Continued)

FOREIGN PATENT DOCUMENTS

CN        1567418 A      1/2005
CN      101512628 A      8/2009
(Continued)

*Primary Examiner* — Nelson M Rosario
(74) *Attorney, Agent, or Firm* — Andrew C. Cheng

(57) ABSTRACT

The present disclosure discloses a liquid crystal display and the driving circuit thereof. The driving circuit comprises multiple liquid crystal driving units arranged in an array of N rows and M columns. Wherein, the liquid crystal driving unit located at i-th row and j-th column comprises: a first transistor, the gate thereof being connected to the i-th gate line, the source thereof being connected to the j-th data line; a second transistor, the gate thereof being connected to the i-th discharge control line, the source thereof being connected to the i-th discharge wire; a liquid crystal capacitor and a storage capacitor connected in parallel, first terminals thereof being connected to the drain of the first transistor and the source of the second transistor, second terminals of the liquid crystal capacitor and the storage capacitor being connected to the i-th discharge wire.

9 Claims, 3 Drawing Sheets

(52) U.S. Cl.
 CPC ... *G09G 3/3614* (2013.01); *G09G 2310/0218* (2013.01); *G09G 2310/0248* (2013.01); *G09G 2320/0233* (2013.01)

(56) References Cited

U.S. PATENT DOCUMENTS

| | | | |
|---|---|---|---|
| 2008/0048962 A1 | 2/2008 | Wu | |
| 2011/0216039 A1* | 9/2011 | Chen | G06F 3/0412 345/174 |
| 2016/0071473 A1* | 3/2016 | Ahn | G09G 3/3614 345/690 |

FOREIGN PATENT DOCUMENTS

| | | |
|---|---|---|
| CN | 103680439 A | 3/2014 |
| CN | 105869600 A | 8/2016 |
| KR | 20040110304 A | 12/2004 |

* cited by examiner

LIQUID CRYSTAL DISPLAY AND THE DRIVING CIRCUIT THEREOF

BACKGROUND OF THE INVENTION

1. Field of the Invention

The present disclosure relates to the fields of display technology, and in particular to a liquid crystal display and the driving circuit thereof.

2. The Related Arts

Liquid crystal display (LCD) is controlling the amount of light penetration by rotating liquid crystal to display different brightness. In order to prevent the liquid crystal polarization producing screen residual, the voltage of controlling liquid crystal molecules deflection has polarity. The adjacent frames have opposite polarities, so liquid crystal molecules are switched between the positive deflection and the negative deflection during two screen switching. The switches between the positive and the negative polarity lead to large deflection angle of the liquid crystal molecules, so the LCD displaying a dynamic picture is slower, and there will be a smear phenomenon when displaying fast-moving objects. In order to solve the smear phenomenon, black frame insertion technology has been adopted. That is, add a non-deflected black screen as transition between two frames with opposite deflection direction of liquid crystal molecules, which is called as black frame insertion. However, the conventional black frame insertion technology display needs twice data transfer rate, which increases the performance requirements of the timing controller. In addition, because the rate is double, pixel charging time is reduced, and then display images are deteriorated.

SUMMARY OF THE INVENTION

To overcome the deficiencies of the prior art, the embodiment of the present disclosure provides a liquid crystal display and the driving circuit thereof.

According to the first embodiment of the present disclosure, it provides a driving circuit of liquid crystal display, comprising: first to M-th data lines, which are connected to a data driver of the liquid crystal display to receive a first data signal to a M-th data signal from the data driver, M being positive integer; first to N-th gate lines, which are connected to a gate driver of the liquid crystal display to receive a first gate driving signal to a N-th gate driving signal from the gate driver, N being positive integer; first to N-th discharge wires; first to N-th discharge control lines, which are connected to the gate driver of the liquid crystal display to receive a first discharge control signal to a N-th discharge control signal from the gate driver; multiple liquid crystal driving units arranged in an array of N rows and M columns, wherein, the liquid crystal driving unit located at i-th row and j-th column comprises: a first transistor, the gate of the first transistor being connected to the i-th gate line to receive the i-th gate driving signal, the source of the first transistor being connected to the j-th data line to receive the j-th data signal; a second transistor, the gate of the second transistor being connected to the i-th discharge control line to receive the i-th discharge control signal, the source of the second transistor being connected to the i-th discharge wire; a liquid crystal capacitor and a storage capacitor connected in parallel, first terminals of the liquid crystal capacitor and the storage capacitor being connected to the drain of the first transistor and the source of the second transistor, second terminals of the liquid crystal capacitor and the storage capacitor being connected to the i-th discharge wire; wherein, i and j are positive integers, after the first transistor is turned on based on the i-th gate driving signal for a predetermined time, the second transistor is turned on based on the i-th discharge control signal, the liquid crystal capacitor and the storage capacitor are discharged through the i-th discharge wire, so that the two ends of the liquid crystal capacitor have no voltage difference, the liquid crystal molecules are in a non-deflected state and then perform black frame insertion operation.

According to the embodiment of the present disclosure, the gate driver generates periodic clock signals, when the gate driver generates the i-th clock signal after a timing controller of the liquid crystal display generates a first start signal, the i-th gate line receives the i-th gate driving signal from the gate driver.

According to the embodiment of the present disclosure, the first gate driving signal to the N-th gate driving signal respectively continues for one clock signal period.

According to the embodiment of the present disclosure, the gate driver generates periodic clock signals, when the gate driver generates the i-th clock signal after the timing controller of the liquid crystal display generates a second start signal, the i-th discharge control line receives the i-th discharge control signal from the gate driver.

According to the embodiment of the present disclosure, the first discharge control signal to the N-th discharge control signal respectively continues for one clock signal period.

According to the embodiment of the present disclosure, the first start signal and the second start signal are at an interval of the predetermined time, the predetermined time is k clock signal periods, wherein, k is positive integer, $1 \leq k \leq N$.

According to the embodiment of the present disclosure, the first start signal is generated before the second start signal.

According to the embodiment of the present disclosure, the timing controller of the liquid crystal display adjusts the size of k.

According to the embodiment of the present disclosure, when the first transistor is turned on based on the i-th gate driving signal, the liquid crystal capacitor and the storage capacitor are charged, so that the liquid crystal molecules are in a deflected state and then perform display operation.

According to the second embodiment of the present disclosure, it provides a liquid crystal display, the liquid crystal display comprises the driving circuit according to the first embodiment of the present disclosure.

The following description will partially illustrate the additional aspects and/or advantages of the present invention. One part will be clear through the description, or may be learned through embodiments of the present invention.

BRIEF DESCRIPTION OF THE DRAWINGS

By illustrating the accompanying drawings and the detailed descriptions as follows, the objects, the features and the advantages of the present invention will become more apparent, wherein.

DETAILED DESCRIPTION OF THE PREFERRED EMBODIMENTS

Figure 1:
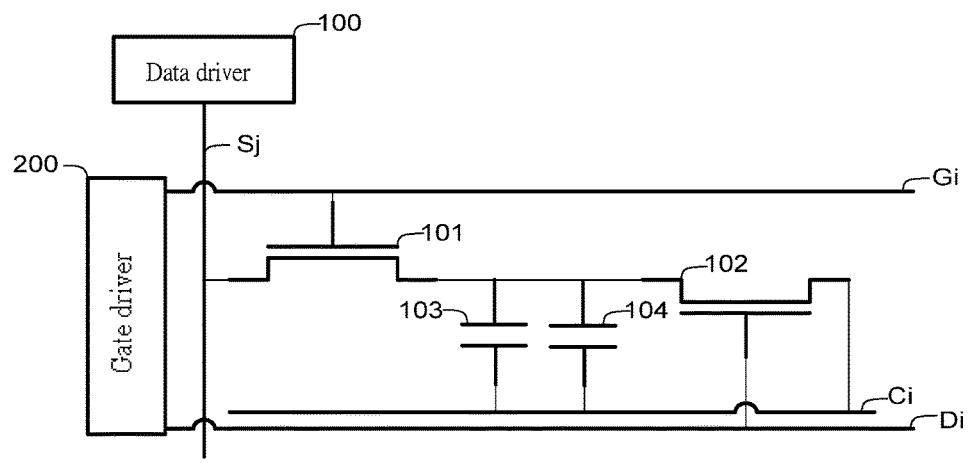
FIG. 1 is a schematic view illustrating the liquid crystal driving unit according to the embodiment of the present disclosure.

An exemplary embodiment of the present invention will now be described in detail, and the embodiments will be shown in the accompanying drawings. Wherein, the same numerals indicate the same portions. The following will describe the embodiments referring to the drawings in order to explain the present invention.

It should be understood that the disclosed embodiments are merely exemplary, and that other embodiments may employ various alternative forms. Drawings are not necessarily scaled, which may exaggerate or minimize the characteristics to show details of the particular components. The specific structural and functional details disclosed herein are not to be construed as limiting, which is only used for teaching one skilled in the art to use the representative basis of the present invention in various forms. One of ordinary skill in the art will appreciate that the various features of any drawing and description can combine with one or more other features illustrated in the drawings to produce the embodiments not explicitly illustrated or described. The combinations of the illustrated features provide the embodiments for typical applications. However, various combinations and variations consistent with the features taught in the present disclosure may be desired for particular applications or embodiments.

FIG. 1 is a schematic view illustrating the liquid crystal driving unit according to the embodiment of the present disclosure. The data line Sj is connected to the sources of a data driver 100 and a first transistor 101 of the liquid crystal display (not shown). The gate line Gi is connected to the gate of the gate driver 200 and the first transistor 101 of the liquid crystal display. First terminals of a liquid crystal capacitor 103 and a storage capacitor 104 connected in parallel are connected to the drain of the first transistor 101 and the source of the second transistor 102. A discharge control line Di is connected to the gate driver 200 of the liquid crystal display and the gate of the second transistor 102. Second terminals of the liquid crystal capacitor 103 and the storage capacitor 104 and the drain of the second transistor 102 are respectively connected to the discharge wire Ci.

The data line Sj can receive the data signal from the data driver 100, and then transfer the data signal to the source of the first transistor 101. The data signal can be a voltage signal with a predetermined voltage value. When the gate driving signal received from the gate driver 200 by the gate line Gi is high voltage, the voltage of the gate of the first transistor 101 is high voltage. At this time, the first transistor 101 can be turned on, the data signal of the source of the first transistor 101 can be transferred to the first terminals of the liquid crystal capacitor 103 and the storage capacitor 104. Therefore, the liquid crystal capacitor 103 and the storage capacitor 104 are charged, there is a voltage difference between the first terminals and the second terminals. The voltage difference makes the liquid crystal molecules deflected, which performs display operation. The voltage difference and the liquid crystal molecules deflection of the first terminals and the second terminals of the liquid crystal capacitor 103 and the storage capacitor 104 are corresponding to the display effects of the liquid crystal driving unit. that is, the voltage difference with predetermined number can make the liquid crystal molecules correspondingly deflected, so that the liquid crystal driving unit performs the corresponding display effect.

To perform black frame insertion to resolve the smear phenomenon of display, it needs to perform the operation making the voltage difference between the first terminals and the second terminals of the liquid crystal capacitor 103 and the storage capacitor 104 be zero between two charging operations of the liquid crystal capacitor 103 and the storage capacitor 104. That is, the liquid crystal molecules are not deflected once. In the present embodiment, discharge the first terminals of the liquid crystal capacitor 103 and the storage capacitor 104. The source of second transistor 102 is connected to the first terminals of the liquid crystal capacitor 103 and the storage capacitor 104, the gate of the second transistor 102 is connected to the discharge control line Di, the drain of the second transistor 102 is connected to the discharge wire Ci, the second terminals of the liquid crystal capacitor 103 and the storage capacitor 104 are connected to the discharge wire Ci. When the discharge control signal received from the gate driver 200 by the discharge control line Di is high voltage, the voltage of the gate of the second transistor 102 is high voltage. At this time, the second transistor 102 is turned on, the first terminals of the liquid crystal capacitor 103 and the storage capacitor 104 are communicated with the discharge wire C1. Therefore, the first terminals are discharged, the voltage difference voltage between the first terminals and the second terminals is zero, so that the liquid crystal molecules are not deflected, so the liquid crystal molecules are opaque (light is not allowed to penetrate the liquid crystal molecules), and then perform black frame insertion operation.

Figure 2:
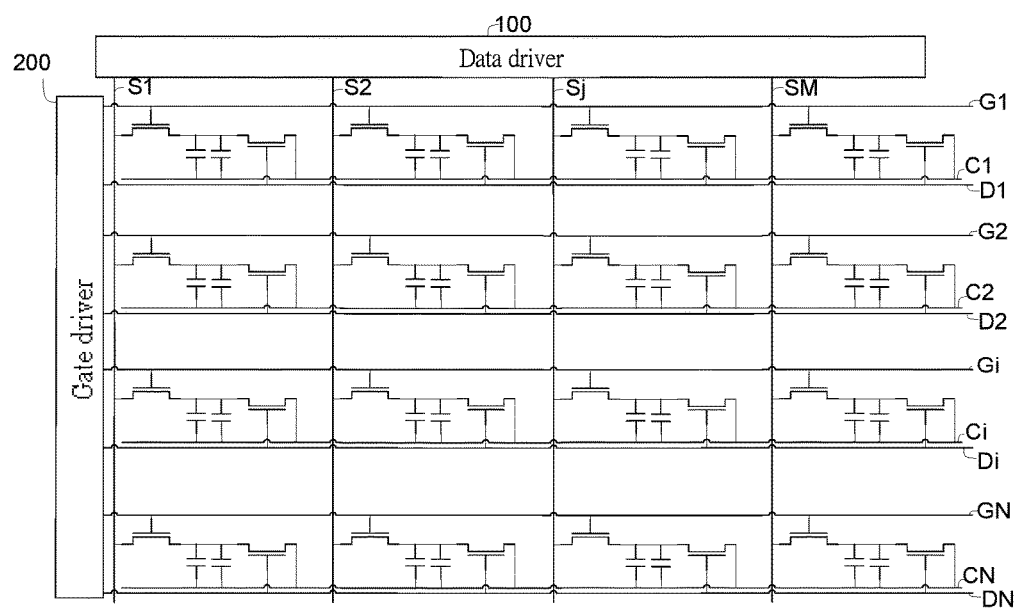
FIG. 2 is a schematic view illustrating the driving circuit of liquid crystal display according to the embodiment of the present disclosure.

FIG. 2 is a schematic view illustrating the driving circuit of liquid crystal display according to the embodiment of the present disclosure. The liquid crystal driving circuit comprises multiple liquid crystal driving units arranged in an array of N rows and M columns (N and M are positive integer). That is, the number of the liquid crystal driving units in the liquid crystal driving circuit is the product of N and M. Wherein, the liquid crystal driving unit at i rows and j columns ($1 \leq i \leq N$, $1 \leq j \leq M$) is shown in FIG. 1.

The liquid crystal driving circuit comprises M data lines, such as S1, S2, S3, . . . , Sj, . . . , SM. The M data lines are connected with the data driver 100 of the liquid crystal display, which respectively receives the first data signal to the M-th data signal (the data line Sj receives the j-th data signal). The M data lines are further connected to the sources of the first transistors of all liquid crystal driving units on each column (the data line Sj is connected to the sources of the first transistors of all liquid crystal driving units on the j-th column), so that the j-th data signal is transferred to the sources of the first transistors of all liquid crystal driving units on the j-th column.

The liquid crystal driving circuit comprises N gate lines, such as G1, G2, G3, . . . , Gi, . . . , GN. The N gate lines are connected with the gate driver 200 of the liquid crystal display, which respectively receives the first gate driving signal to the N-th gate driving signal (the gate line Gi receives the i-th gate driving signal). The N gate lines are further connected to the gates of the first transistors of all liquid crystal driving units on each row (the gate line Gi is connected to the gates of the first transistors of all liquid crystal driving units on the i-th row), so that the i-th gate signal is transferred to the gates of the first transistors of all liquid crystal driving units on the i-th row, so that the voltages of the gates of the first transistors of all liquid crystal driving units on the i-th row are high voltage. Therefore, the first transistors of all liquid crystal driving units on the i-th row are turned on, the first data signal to the M-th data signal can be transferred to the first terminals of the liquid crystal capacitor and the storage capacitor of all liquid crystal driving units on the i-th row to generate the voltage difference between the first terminal and the second terminal, and then the liquid crystal molecules are deflected.

The liquid crystal driving circuit comprises N discharge control lines, such as D1, D2, D3, . . . , Di, . . . , DN. The N discharge control lines are connected with the gate driver 200 of the liquid crystal display, which respectively receives the first discharge control signal to the N-th discharge control signal (the discharge control line Di receives the i-th discharge control signal). The N discharge control lines are further connected to the gates of the second transistors of all liquid crystal driving units on each row (the discharge control line Di is connected to the gates of the second transistors of all liquid crystal driving units on the i-th row), so that the i-th discharge control signal is transferred to the gates of the second transistors of all liquid crystal driving units on the i-th row, so that the voltages of the gates of the second transistors of all liquid crystal driving units on the i-th row are high voltage, and then the second transistors of all liquid crystal driving units on the i-th row are turned on.

The liquid crystal driving circuit comprises N discharge wires, such as C1, C2, C3, . . . , Ci, . . . , CN. The N discharge wires are respectively connected to the second terminals of the liquid crystal capacitor and the storage capacitor of all liquid crystal driving units and the drain of the second transistor (discharge wire Ci is connected to the second terminals of the liquid crystal capacitor and the storage capacitor of all liquid crystal driving units on the i-th row and the drain of the second transistor), which discharges the liquid crystal capacitor and the storage capacitor to make no voltage difference between the first terminal and the second terminal when the second transistors of all liquid crystal driving units on the i-th row are turned on, and then perform the black frame insertion operation.

The following describes the timing operation method of the black frame insertion operation of the liquid crystal driving circuit as shown in FIG. 2.

Figure 3:
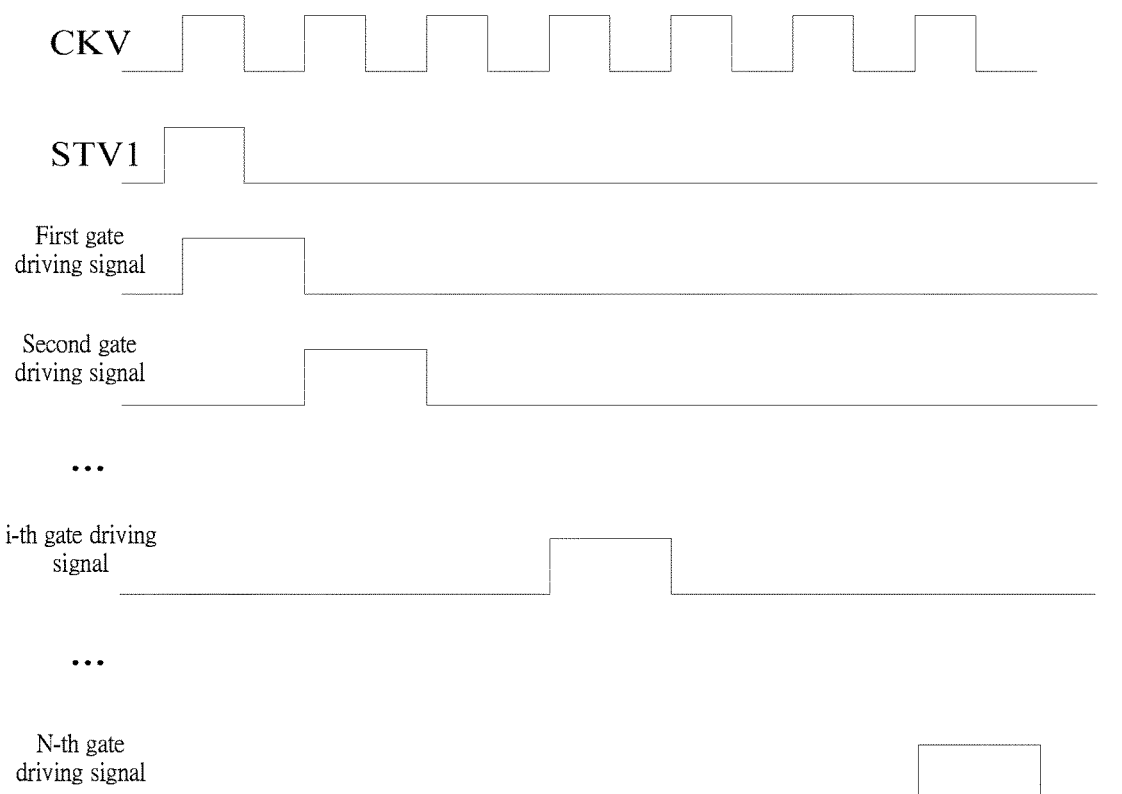
FIG. 3 is a schematic view illustrating the sequential logic of the gate driving signal according to the embodiment of the present disclosure.

FIG. 3 is a schematic view illustrating the sequential logic of the gate driving signal according to the embodiment of the present disclosure. The gate driver 200 generates periodic clock signals CKV. The timing controller (not shown) of the liquid crystal display generates a first start signal STV1. The i-th clock signal generated by the gate driver after the first start signal STV1 is generated is an i-th clock signal. When the i-th clock signal is generated, the i-th gate line Gi receives the i-th gate driving signal from the gate driver 200, so that the voltages of the gates of the first transistors of all liquid crystal driving units on the i-th row are high voltage. Therefore, the first transistors of all liquid crystal driving units on the i-th row are turned on. At this time, the first data signal to the M-th data signal can be transferred to the first terminals of the liquid crystal capacitor and the storage capacitor of all liquid crystal driving units on the i-th row to generate the voltage difference between the first terminal and the second terminal, and then the liquid crystal molecules are deflected. The first gate driving signal to the N-th gate driving signal respectively continues for one clock signal period.

For example, the first clock signal generated by the gate driver after the first start signal STV1 is generated is a first clock signal. When the first clock signal is generated, the first gate line G1 receives the first gate driving signal from the gate driver 200, so that the voltages of the gates of the first transistors of all liquid crystal driving units on the first row are high voltage. Therefore, the first transistors of all liquid crystal driving units on the first row are turned on, and then the liquid crystal molecules are deflected. The first gate driving signal continues for one clock signal period. After one clock signal period is finished, the first gate driving signal is disappeared, the first transistors of all liquid crystal driving units on the first row are restored to the off state. At the same time, the second clock signal is generated, the second gate line G2 receives the second gate driving signal from the gate driver 200, and the first transistors of all liquid crystal driving units on the second row are turned on. After continuing for one clock signal period, the second gate driving signal is disappeared, the first transistors of all liquid crystal driving units on the second row are restored to the off state. At the same time, the third clock signal is generated, and so on. It is performed until the N-th gate driving signal is disappeared. At this time, the N-th clock period is over. In this way, it scans all liquid crystal driving unit on each row. After the N-th clock period is over, it can immediately generate the first start signal STV1 again. It can also generate the first start signal STV1 after waiting for a predetermined time, and then repeat the above operation.

Figure 4:
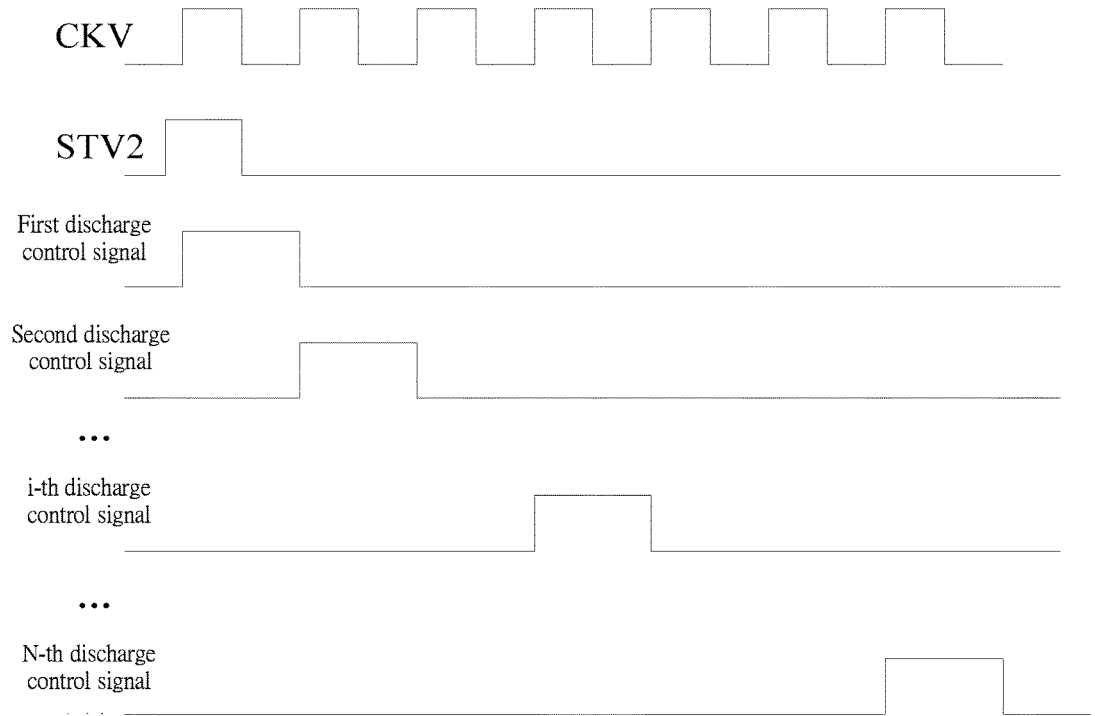
FIG. 4 is a schematic view illustrating the sequential logic of the discharge control signal according to the embodiment of the present disclosure.

FIG. 4 is a schematic view illustrating the sequential logic of the discharge control signal according to the embodiment of the present disclosure. The gate driver 200 generates periodic clock signals CKV. The timing controller (not shown) of the liquid crystal display generates a second start signal STV2. When the i-th clock signal generated after the second start signal STV2 is generated, the i-th discharge control line Di receives the i-th discharge control signal from the gate driver 200, so that the voltages of the gates of the second transistors of all liquid crystal driving units on the i-th row are high voltage. Therefore, the second transistors of all liquid crystal driving units on the i-th row are turned on. At this time, the first terminals and the second terminals of the liquid crystal capacitor and the storage capacitor of all liquid crystal driving units on the i-th row are turned on. That is, the first terminals of the liquid crystal capacitor and the storage capacitor are connected to the i-th discharge wire Ci, so that the first terminals and the second terminals of the liquid crystal capacitor and the storage capacitor have no voltage difference, the liquid crystal molecules are not deflected and then perform black frame insertion operation. The first discharge control signal to the N-th discharge control signal respectively continues for one clock signal period.

For example, when the first clock signal is generated after the second start signal STV2 is generated, the discharge control line D1 receives the first discharge control signal from the gate driver 200, so that the voltages of the gates of the second transistors of all liquid crystal driving units on the first row are high voltage. Therefore, the second transistors of all liquid crystal driving units on the first row are turned on, which discharges the liquid crystal capacitor and the storage capacitor of all liquid crystal driving units on the first row, and then perform the black frame insertion operation. The first gate driving signal continues for one clock signal period. After one clock signal period is finished, the first discharge control signal is disappeared, the second transistors of all liquid crystal driving units on the first row are restored to the off state. At the same time, the second clock signal is generated, the second discharge control line D2 receives the second discharge control signal from the gate driver 200, and the second transistors of all liquid crystal driving units on the second row are turned on. After continuing for one clock signal period, the second discharge control signal is disappeared, the second transistors of all liquid crystal driving units on the second row are restored to the off state. At the same time, the third clock signal is generated, and so on. It is performed until the N-th discharge control signal is disappeared. At this time, the N-th clock period is over. In this way, it scans all liquid crystal driving unit on each row. The second start signal STV2 is generated after the first start signal STV1, the interval between the second start signal STV2 and the first start signal STV1 is predetermined and adjustable. According to the first start signal STV1, it can immediately generate the second start signal STV2 again, it can also generate the second start signal STV2 again after waiting for the predetermined time, and then repeat the above operation.

Figure 5:
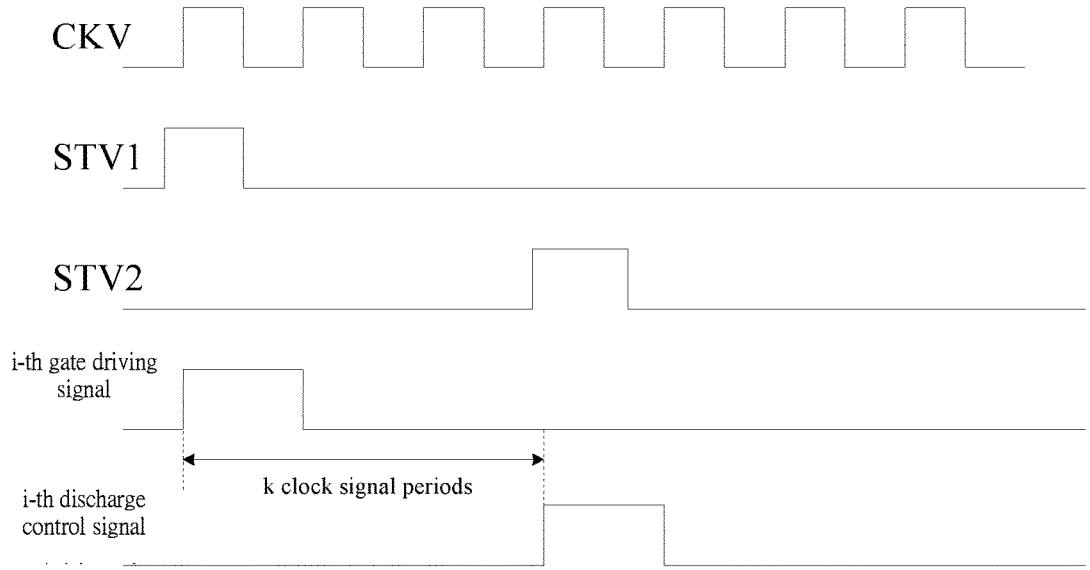
FIG. 5 is a schematic view illustrating the timing relationship between the gate driving signal and the discharge control signal according to the embodiment of the present disclosure.

FIG. 5 is a schematic view illustrating the timing relationship between the gate driving signal and the discharge control signal according to the embodiment of the present disclosure. In the present embodiment, the second start signal STV2 is generated after the first start signal STV1, and the interval between the second start signal STV2 and the first start signal STV1 is k clock signal periods. Wherein, k is positive integer, $1 \leq k \leq N$. The k value is adjusted by the timing controller, which can adjust the interval between the charge and the discharge of the liquid crystal capacitor and the storage capacitor, and then adjust the deflecting time of the liquid crystal molecules, so that the screen display is optimized.

For example, but not limited, k value is 10, and then the interval between the charge and the discharge of the liquid crystal capacitor and the storage capacitor is 10 clock signal periods. That is, after charging the liquid crystal capacitor and the storage capacitor for 10 clock signal periods, discharge the liquid crystal capacitor and the storage capacitor. In other words, it performs the black frame insertion operation after the liquid crystal molecules deflecting for 10 clock signal periods. After performing the black frame insertion operation, it can wait for the next scan to charge the liquid crystal capacitor and the storage capacitor.

The present invention can be applied to various types of liquid crystal displays, such as thin film transistor liquid crystal display (TFT-LCD), and so on.

By utilizing the present invention, it achieves the technology of adding a non-deflected black screen as transition between two frames with opposite deflection direction of liquid crystal molecules, that is black frame insertion, which solves the smear phenomenon appeared when displaying fast-moving objects. Moreover, because the black frame insertion operation is achieved by discharging the liquid crystal capacitor and the storage capacitor, it does not increase the operating load of the timing controller and does not increase the data transfer rate, so as not to shorten the charging time of the liquid crystal capacitor and the storage capacitor, which ensures the screen display effects.

The present invention referring to the exemplary embodiment is specifically described and illuminated, but the present invention is not limited. For those having ordinary skills in the art should understand that it can changed in various forms and details without departing from the spirit and scope of the claim defined by the present invention. Various features of the embodiments may be combined to form a further embodiment of the present invention which may not be explicitly described or shown. Wherein, the scopes of the invention are defined in the claims and their equivalents.

What is claimed is:

1. A driving circuit of liquid crystal display, comprising:
   first to M-th data lines, which are connected to a data driver of the liquid crystal display to receive a first data signal to a M-th data signal from the data driver, M being positive integer;
   first to N-th gate lines, which are connected to a gate driver of the liquid crystal display to receive a first gate driving signal to a N-th gate driving signal from the gate driver, N being positive integer;
   first to N-th discharge wires;
   first to N-th discharge control lines, which are connected to the gate driver of the liquid crystal display to receive a first discharge control signal to a N-th discharge control signal from the gate driver;
   multiple liquid crystal driving units arranged in an array of N rows and M columns, wherein, the liquid crystal driving unit located at i-th row and j-th column comprises:
   a first transistor, the gate of the first transistor being connected to the i-th gate line to receive the i-th gate driving signal, the source of the first transistor being connected to the j-th data line to receive the j-th data signal;
   a second transistor, the gate of the second transistor being connected to the i-th discharge control line to receive the i-th discharge control signal, the source of the second transistor being connected to the i-th discharge wire;
   a liquid crystal capacitor and a storage capacitor connected in parallel, first terminals of the liquid crystal capacitor and the storage capacitor being connected to the drain of the first transistor and the source of the second transistor, second terminals of the liquid crystal capacitor and the storage capacitor being connected to the i-th discharge wire;
   wherein, i and j are positive integers, $1 \leq i \leq N$, $1 \leq j \leq M$, after the first transistor is turned on based on the i-th gate driving signal for a predetermined time, the second transistor is turned on based on the i-th discharge control signal, the liquid crystal capacitor and the storage capacitor are discharged through the i-th discharge wire, so that the two ends of the liquid crystal capacitor have no voltage difference, the liquid crystal molecules are in a non-deflected state and then perform black frame insertion operation;
   wherein the gate driver generates periodic clock signals, when the gate driver generates the i-th clock signal after a timing controller of the liquid crystal display generates a first start signal, the i-th gate line receives the i-th gate driving signal from the gate driver.

2. The driving circuit of liquid crystal display as claimed in claim 1, wherein the first gate driving signal to the N-th gate driving signal respectively continues for one clock signal period.

3. The driving circuit of liquid crystal display as claimed in claim 1, wherein the gate driver generates periodic clock signals, when the gate driver generates the i-th clock signal after the timing controller of the liquid crystal display generates a second start signal, the i-th discharge control line receives the i-th discharge control signal from the gate driver.

4. The driving circuit of liquid crystal display as claimed in claim 3, wherein the first discharge control signal to the N-th discharge control signal respectively continues for one clock signal period.

5. The driving circuit of liquid crystal display claimed in claim 3, wherein the first start signal and the second start signal are at an interval of the predetermined time, the predetermined time is k clock signal periods, wherein, k is positive integer, $1 \leq k \leq N$.

6. The driving circuit of liquid crystal display as claimed in claim 5, wherein the first start signal is generated before the second start signal.

7. The driving circuit of liquid crystal display as claimed in claim 5, wherein the timing controller of the liquid crystal display adjusts the size of k.

8. The driving circuit of liquid crystal display as claimed in claim 1, wherein, when the first transistor is turned on based on the i-th gate driving signal, the liquid crystal capacitor and the storage capacitor are charged, so that the liquid crystal molecules are in a deflected state and then perform display operation.

9. A liquid crystal display, comprising a driving circuit, wherein, the driving circuit comprises:
   first to M-th data lines, which are connected to a data driver of the liquid crystal display to receive a first data signal to a M-th data signal from the data driver, M being positive integer;
   first to N-th gate lines, which are connected to a gate driver of the liquid crystal display to receive a first gate driving signal to a N-th gate driving signal from the gate driver, N being positive integer;
   first to N-th discharge wires;
   first to N-th discharge control lines, which are connected to the gate driver of the liquid crystal display to receive a first discharge control signal to a N-th discharge control signal from the gate driver;
   multiple liquid crystal driving units arranged in an array of N rows and M columns, wherein, the liquid crystal driving unit located at i-th row and j-th column comprises:
   a first transistor, the gate of the first transistor being connected to the i-th gate line to receive the i-th gate driving signal, the source of the first transistor being connected to the j-th data line to receive the j-th data signal;
   a second transistor, the gate of the second transistor being connected to the i-th discharge control line to receive the i-th discharge control signal, the source of the second transistor being connected to the i-th discharge wire;
   a liquid crystal capacitor and a storage capacitor connected in parallel, first terminals of the liquid crystal capacitor and the storage capacitor being connected to the drain of the first transistor and the source of the second transistor, second terminals of the liquid crystal capacitor and the storage capacitor being connected to the i-th discharge wire;
   wherein, i and j are positive integers, $1 \leq i \leq N$, $1 \leq j \leq M$, after the first transistor is turned on based on the i-th gate driving signal for a predetermined time, the second transistor is turned on based on the i-th discharge control signal, the liquid crystal capacitor and the storage capacitor are discharged through the i-th discharge wire, so that the two ends of the liquid crystal capacitor have no voltage difference, the liquid crystal molecules are in a non-deflected state and then perform black frame insertion operation;
   wherein the gate driver generates periodic clock signals, when the gate driver generates the i-th clock signal after a timing controller of the liquid crystal display generates a first start signal, the i-th gate line receives the i-th gate driving signal from the gate driver.

* * * * *